(12) United States Patent
Brickner

(10) Patent No.: US 11,028,912 B2
(45) Date of Patent: Jun. 8, 2021

(54) DRIVE ARRANGEMENT FOR MOTORIZED ADJUSTMENT OF AN ACTUATING ELEMENT ROTATABLY MOUNTED IN A MOTOR VEHICLE DOOR LATCH HOUSING

(71) Applicant: Kiekert Aktiengesellschaft, Heiligenhaus (DE)

(72) Inventor: Robert L. Brickner, Berkley, MI (US)

(73) Assignee: Kiekert AG, Heiligenhaus (DE)

( * ) Notice: Subject to any disclaimer, the term of this patent is extended or adjusted under 35 U.S.C. 154(b) by 946 days.

(21) Appl. No.: 15/696,329

(22) Filed: Sep. 6, 2017

(65) Prior Publication Data

US 2018/0066737 A1    Mar. 8, 2018

Related U.S. Application Data

(60) Provisional application No. 62/384,263, filed on Sep. 7, 2016.

(51) Int. Cl.
| | | |
|---|---|---|
| *E05B 81/06* | (2014.01) |
| *E05B 81/18* | (2014.01) |
| *F16H 25/20* | (2006.01) |
| *E05B 81/40* | (2014.01) |
| *E05B 81/24* | (2014.01) |

(52) U.S. Cl.
CPC ............. *F16H 25/20* (2013.01); *E05B 81/06* (2013.01); *E05B 81/18* (2013.01); *E05B 81/25* (2013.01); *E05B 81/40* (2013.01); *F16H 2025/204* (2013.01); *F16H 2025/2043* (2013.01); *F16H 2025/2075* (2013.01)

(58) Field of Classification Search
CPC ............. F16H 25/20; F16H 2025/2075; F16H 2025/2043; F16H 2025/204; E05B 81/40; E05B 81/25; E05B 81/06; E05B 81/18
See application file for complete search history.

(56) References Cited

U.S. PATENT DOCUMENTS

| | | | |
|---|---|---|---|
| 4,135,377 A * | 1/1979 | Kleefeldt ................ E05B 81/25 |
| | | | 292/144 |
| 10,508,478 B2 * | 12/2019 | Topfer ..................... E05B 81/20 |

FOREIGN PATENT DOCUMENTS

| | | | |
|---|---|---|---|
| DE | 25 53 901 A1 | 6/1977 |
| DE | 31 46 804 A1 | 6/1983 |
| DE | 195 01 493 A1 | 7/1996 |
| DE | 10 2008 009 506 A1 | 8/2009 |

* cited by examiner

*Primary Examiner* — Kristina R Fulton
*Assistant Examiner* — Thomas L Neubauer
(74) *Attorney, Agent, or Firm* — Renner, Otto, Boisselle & Sklar, LLP

(57) ABSTRACT

A drive arrangement for motorized adjustment of an actuating element, rotatably mounted inside a motor vehicle door latch housing. The drive arrangement comprises a motor and a spindle drive connected to the motor, the spindle drive containing a spindle and a spindle nut mounted thereon. The spindle is coaxially driven by a driven shaft of the motor. The spindle nut acts on the actuating element in order to rotate it by at least one interposed coupling element. The spindle nut and the coupling element form a single unit.

19 Claims, 3 Drawing Sheets

DRIVE ARRANGEMENT FOR MOTORIZED ADJUSTMENT OF AN ACTUATING ELEMENT ROTATABLY MOUNTED IN A MOTOR VEHICLE DOOR LATCH HOUSING

RELATED APPLICATION DATA

This application claims priority to U.S. Provisional Application No. 62/384,263 filed Sep. 7, 2016, which is hereby incorporated herein by reference in its entirety.

FIELD OF THE INVENTION

The invention relates to a drive arrangement for motorized adjustment of an actuating element rotatably mounted inside a motor vehicle door latch housing, said arrangement comprising a motor and spindle drive connected to the motor, said spindle drive containing a spindle and a spindle nut mounted thereon, with the spindle being coaxially driven by a driven shaft of the motor and in which the spindle nut acts on the actuating element in order to rotate it by means of at least one interposed coupling element.

BACKGROUND

Numerous types of drive arrangements for a motorized adjustment of an actuating element, rotatably mounted in a motor vehicle door latch housing, are used in practical applications and are described in literature. DE 10 2008 009 506 A1 of the applicant discloses, for instance, a motor vehicle door latch, containing a closing/opening means for which it uses a linear drive with a linear actuator. The linear actuator and the respective motor are arranged at an angle to each other and therefore require a relatively large installation space.

Apart from such an application for the closing/opening of a motor vehicle door latch or of its locking mechanism, also other forms of use are known in this context, as for instance described in DE 195 01 493 A1. This document discloses an electric actuator acted upon by a remote control and acting on an adjusting rod by means of a pawl lever and a pawl. In addition to this external actuation, also a mechanical internal actuation that acts on the pawl is possible.

Such drive arrangements are also used together with, for instance, a central locking means as described as an example in DE 31 46 804 A1. In this case, the drive arrangement comprises a threaded spindle and a respective spindle nut, connected to a blocking element. As a result, the blocking element can be moved into a released and locked position.

The generic prior art disclosed in DE 25 53 901 A1 also describes a central locking unit for motor vehicles. Each drive unit contains a reversible electric motor with a reduction gearbox. In detail, the reversible electric motor acts on a coaxially mounted threaded spindle by means of a shaft or drive shaft on the output side. A spindle nut runs along the threaded spindle, said nut containing pins to carry along a single-arm lever. The single-arm lever is, in turn, connected to a drive lever, coupled to a locking head. In this way, an internal locking or generally a central locking can be provided.

Prior art embodiments generally have proven to be satisfactory as regards to best using the space available inside the motor vehicle door latch housing, as the spindle connected coaxially to the driven shaft of the motor already allows a compact design. In prior art embodiments, however, the interposed coupling element still has a sweeping motion in order to act on the actuating element to produce the desired rotation. The invention aims to remedy this.

SUMMARY OF THE INVENTION

The invention addresses the technical problem of further developing such a drive arrangement so that, whilst maintaining the same functional design, the required size is reduced again compared to prior art.

In order to solve this technical problem, the invention suggests that in a generic drive arrangement for motorized adjustment of an actuating element, rotatably mounted in a motor vehicle door latch housing, the spindle nut and the coupling unit form a single unit.

According to the invention, the spindle nut and the coupling element can be joined to form one construction unit. In such an arrangement, the coupling unit can be connected to the spindle nut, for instance by means of a snap-in connection, a clip connection, etc. In a particularly advantageous design, the spindle nut and the coupling element form a single construction unit. This not only provides a particularly compact design but also allows a considerable reduction in manufacturing costs. This applies, in particular, given the fact that the spindle nut and the coupling element are typically designed as a single-piece plastic part and, in particular, as a single-piece plastic injection-molded part. The spindle or threaded spindle can be designed as a plastic part or an ejection-molded plastic part.

As a result, not only are manufacturing costs kept to a minimum but also a low friction and weight are achieved. Also the design of the spindle nut and of the coupling element as a single unit or the design of the spindle unit and of the coupling element as a single component ensure that a particular compact design of the motor vehicle door latch housing, accommodating the inventive actuating element, is achieved. This is due to the fact that the spindle nut mounted on the spindle or threaded spindle and moveable to and fro thereon and the coupling element, forming a single unit therewith, are together linearly moved to and fro when the drive shaft of the motor and thus the spindle rotates.

Due to the spindle or threaded spindle being mounted on the same axis as the drive shaft of the motor, this linear to and fro movement of the coupling element including the spindle nut or of the entire unit is parallel to the respective driven shaft or its extension. As a result, the motor vehicle door latch housing can be particularly small, as the width of the motor vehicle door latch housing is, in this area, practically specified by the width or the diameter of the motor. As the spindle nut and the coupling element, preferably attached to it to form a single piece are mounted on the same axis as the drive shaft of the motor, the design width of the motor vehicle door latch housing is in this area essentially stipulated by the width of the motor. This is of significance given that the respective motor vehicle door latch housing is usually arranged adjacent to a side window pane or a drive for the side window pane or a window lifter, so that the installation space available at this point inside an associated motor vehicle door, is limited.

In addition, the fact that the spindle or threaded spindle, on one hand and the spindle nut that can be moved to and fro thereon, on the other hand, are made of plastic, lead to a reduction in weight. At the same time, friction can be optimized and any resetting effects are reduced to a minimum. This means that the position of the actuating element inside the motor vehicle door latch housing, determined with the aid of the inventive drive arrangement, is reliably maintained even if the motor is switched off. This position of the actuating element can, for instance, be the position "released" or "locked" in connection with a central locking. It is, however, also possible to use the drive arrangement to act on the locking mechanism or a pawl in the sense of a closing/opening operation. Other areas of application are also feasible as already explained above.

A particularly compact and space-saving design is also characterized by the coupling element advantageously connecting to the underside of the spindle nut. As a result, the coupling element practically does not project over the sides of the spindle nut so that the drive motor, having a larger cross section than the spindle nut, ultimately stipulates the size of the motor vehicle door latch housing in this area.

The coupling element also may advantageously contain a journal at its end, engaging in a seat of the actuating element in order to rotate said element. As the coupling element follows the linear movements of the spindle nut, the journal at its end ensures that this linear movement is translated into a respective rotating movement of the actuating element.

The face of the coupling element may be generally L-shaped. One L-shaped leg is connected to the spindle nut and to the underside of the spindle nut. The other L-shaped leg contains, on the other hand, the journal at its end, engaging in the seat of the actuating element in order to rotate it. As a result, the motor vehicle door latch housing can be particularly narrow at least in the area of the L-shaped leg connecting to the underside of the spindle nut. In the area of the other L-shaped leg, containing the journal at its end, the alignment of the L-shaped leg takes into account the dimensioning of the inside of the motor vehicle door latch or of the plane formed by the locking mechanism consisting of catch and pawl, which in most cases extends perpendicular to the C-legs connected to the spindle nut. This means that the motor vehicle door latch housing itself is C-shaped, whilst the also L-shaped coupling element follows the L-shaped form of the motor vehicle door latch housing.

The spindle nut as such generally may have a longitudinal design and may contain a connecting area for the coupling element and a threaded section for engaging in the spindle or the threaded spindle. As the spindle nut may also contain at least one guide means, advantageously interacting with a counter guide means in the motor vehicle door latch housing, the spindle nut and thus also the coupling element, forming the unit with the spindle nut, can be easily aligned and guided inside the motor vehicle door latch housing. This means that the interaction between the at least one guide means and the counter guide means supports the correct linear movement of the spindle nut on the spindle or threaded spindle and thus also of the coupling element, forming the unit together with the spindle nut.

In this way, any malfunctioning can be clearly prevented. Also any reverse rotation of the spindle nut as a result of slackness or elasticity in the drive arrangement can be largely avoided. In addition, the entire inventive drive arrangement can, where required, be simply manually adjusted, for instance in the event that mechanical emergency unlocking is required. In this case, the emergency unlocking ensures, for instance, in the "locked" position, set up by the drive arrangement, that the spindle nut and the coupling element and thus the spindle nut and the motor are manually and mechanically moved in the direction of the "released" position. As a result, a low friction and perfect guidance is achieved.

The invention thus provides a drive arrangement for a motorized adjustment of an actuating element rotatably mounted inside a motor vehicle door latch housing, offering the advantage of a functional and, at the same time, particularly compact design. In addition, this arrangement offers weight and cost savings compared to prior art embodiments.

BRIEF DESCRIPTION OF THE DRAWINGS

Below, the invention is explained in more detail with reference to a drawing showing only one exemplary embodiment, in which.

DETAILED DESCRIPTION

The figures show a drive arrangement for a motorized adjustment of an actuating element 2 rotatably mounted in a motor vehicle door latch housing 1. The actuating element 2 shown in FIGS. 2 and 3 is a cam lever or a transmission lever, acting on a locking element 3 in form of a pin or coupling pin.

Figure 2:
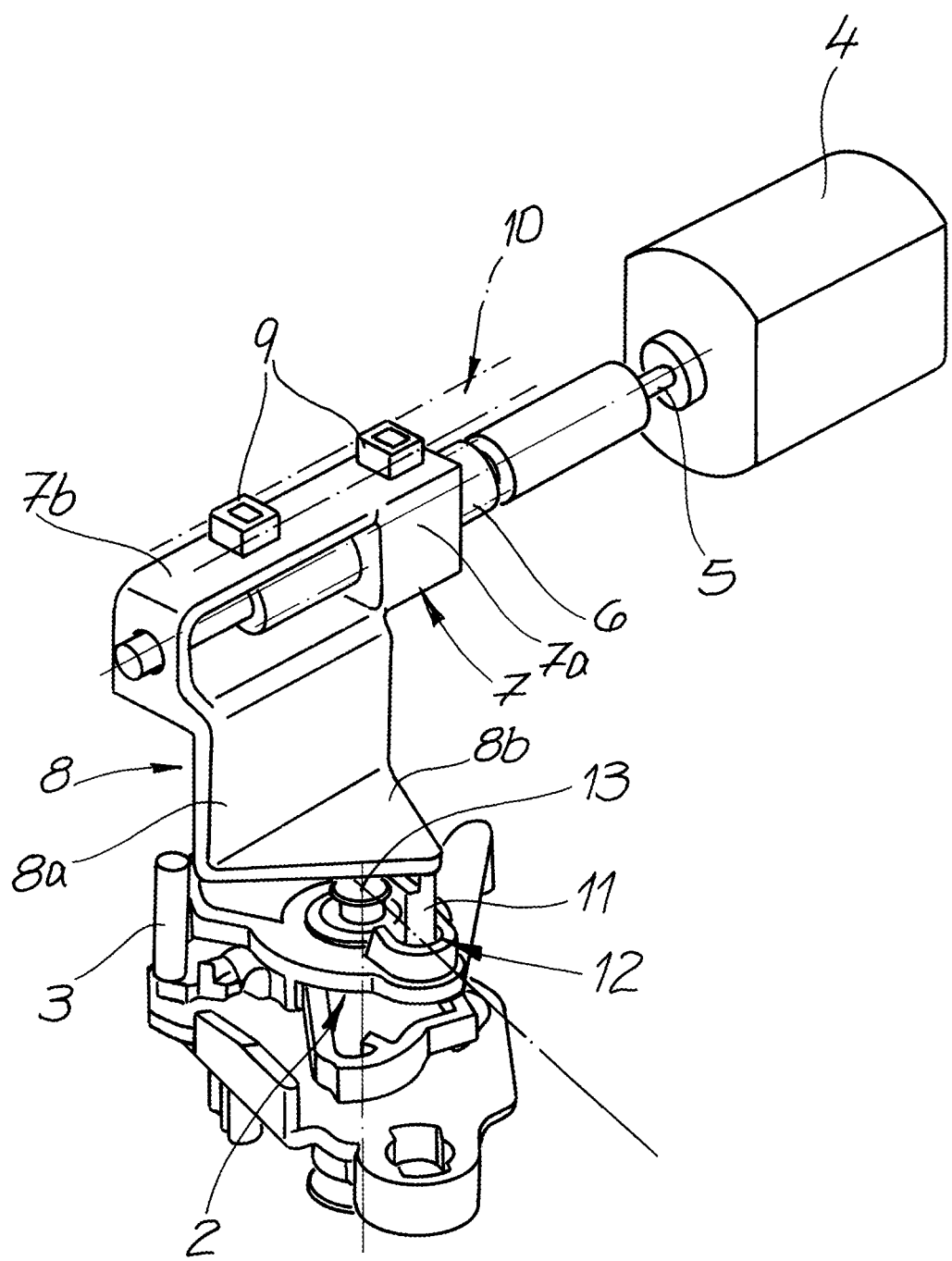

In the "released" position" as shown in FIG. 2, the locking element 3 ensures that in the shown "released" state, an actuating lever chain (external actuating lever chain and/or internal actuating lever chain) is closed. Consequently, the "released" state corresponds to a manual actuation of an internal door handle and/or external door handle by means of the closed actuating lever chain causing a not expressly shown pawl of a locking mechanism, consisting of a catch and pawl, to be lifted off the catch. The previously engaged catch can now open with the aid of a spring and a locking bolt retained by the catch is released. The respective motor vehicle door can be opened, as already generally known.

Figure 3:
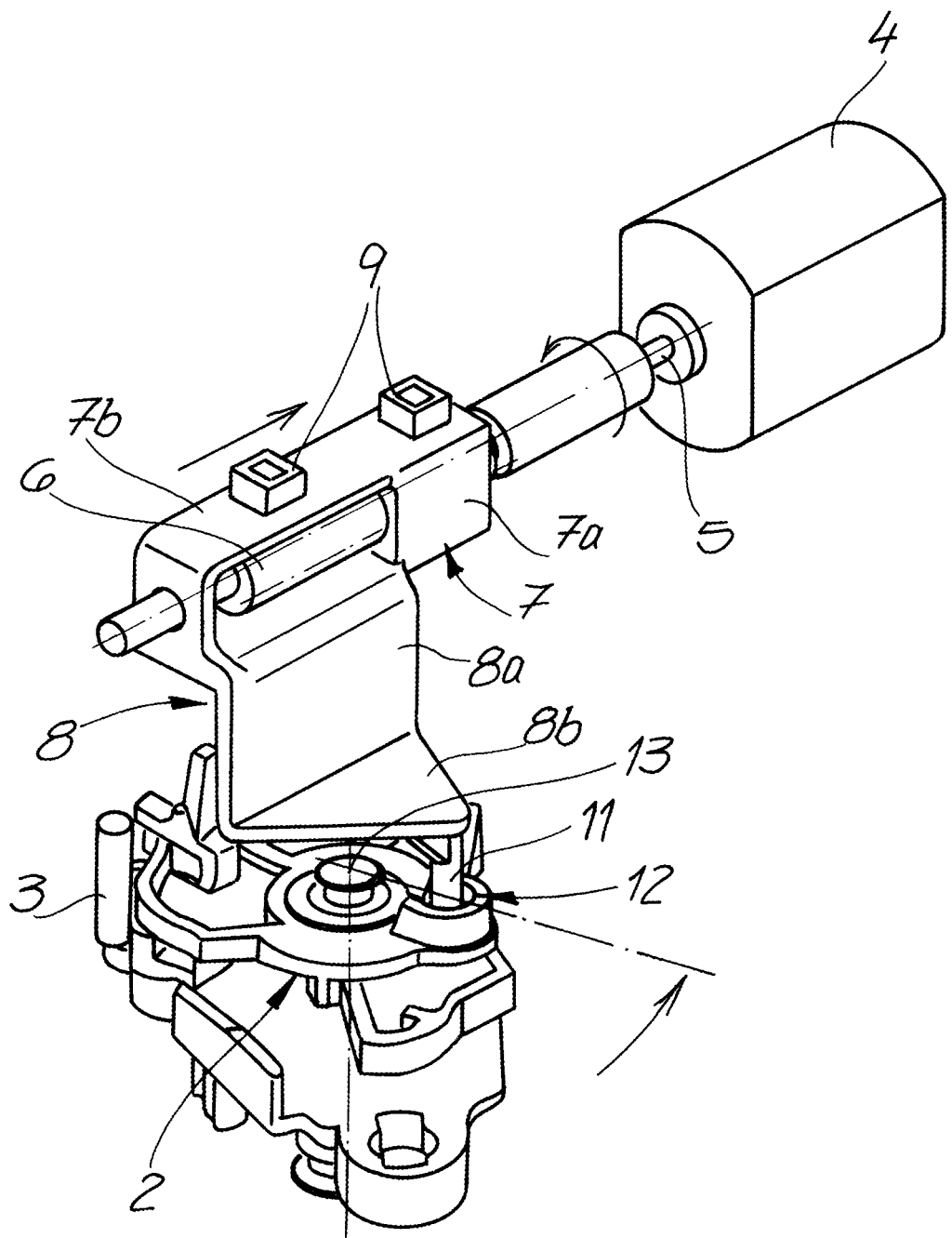

In contrast, the "locked" state shown in FIG. 3 corresponds to the locking element 3 or the respective coupling pin interrupting the mechanical actuating lever chain described above. Consequently, the actuation of the internal door handle or of the external door handle has no effect. A respective manual actuation does, in this case, not cause the locking mechanism to be opened. This, too, is the usual functionality. As an example, reference is made to the aforementioned DE 25 53 901 A1 or DE 43 07 523 A1, describing and explaining the principle functioning of such a central locking drive, which are hereby incorporated herein by reference.

Figure 1:
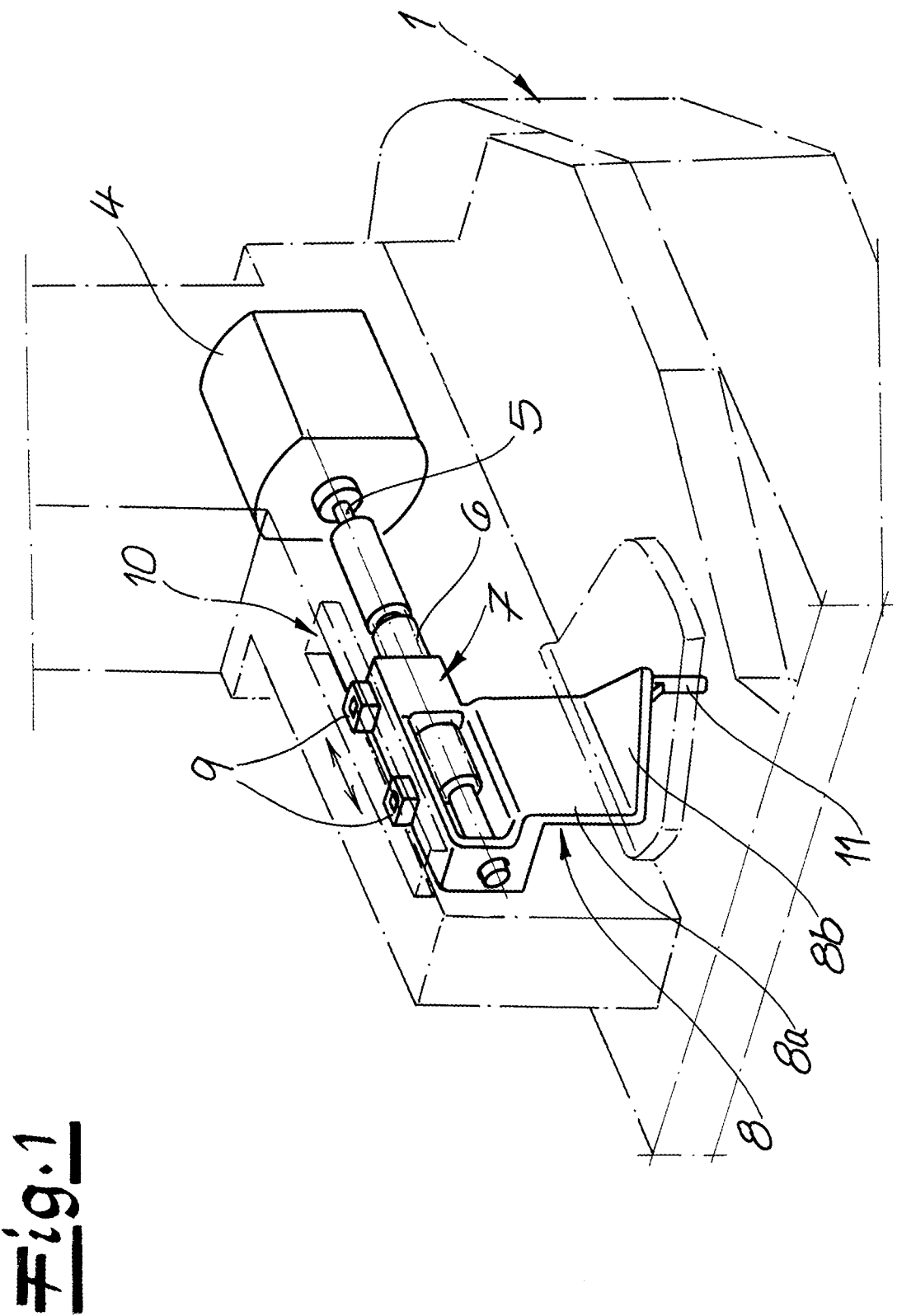
FIG. 1 shows a perspective view of the drive arrangement, reduced to the components essential for the invention and an indicated housing, FIG. 2 the object of FIG. 1 together with other components of the motor vehicle door latch in the "released" position, FIG. 3 the object of FIG. 2 in the "locked" position.

FIG. 1 shows the main components of the respective drive arrangement for motorized adjustment of the actuating element 2, rotatably mounted in the motor vehicle door latch housing 1. The drive arrangement actually contains a motor or electric motor 4. The motor or electric motor 4 contains a drive shaft 5 which is rotated with the aid of the motor 4. The drive shaft 5 of the motor 4 rotates a spindle or threaded spindle 6 mounted on the same axis. The spindle 6 is part of a spindle drive 6, 7.

A spindle nut 7 is then mounted on the spindle 6. According to the example, the spindle nut 7 extends longitudinally. The spindle nut 7 also contains a connecting area 7b for a coupling element 8 and a threaded section 7a for engaging with the spindle or threaded spindle 6. Rotations of the spindle or threaded spindle 6 consequently cause the spindle nut 7 to carry out linear movements in the direction of the double arrow shown in FIG. 1, depending on the direction of rotation of the drive shaft 5 of the motor 4.

The spindle nut 7 also contains at least one guide means 9. In the example, two guide means 9 are provided that extend in the same longitudinal direction or axially. The two guide means 9 interact with the respective counter guide means 10, only indicated in FIG. 1 and which are arranged inside the motor vehicle door latch housing 1. In the embodiment, the counter guide means 10 is a groove. As in this arrangement, the guide means 9 are a rectangle or a square pin and engage in the respective groove, the interaction between the one or the two guide means 9 and the counter guide means 10 ensures that during its linear movement, the spindle nut 7 is correctly guided internally and in relation to the motor vehicle door latch housing 1.

The same applies to the coupling element 8. According to the embodiment and the invention, the spindle nut 7 and the coupling element 8 form one unit 7, 8. In the embodiment, the spindle nut 7 and the coupling element 8 form a single piece. The spindle nut 7 and the coupling element 8 do indeed form a single unit 7, 8, designed as an injection molded plastic part, in this arrangement. The spindle and threaded spindle 6 are also typically a plastic part. The drive arrangement is thus light in weight. In addition, optimized frictional conditions exist between the spindle 6 and the spindle nut 7.

The coupling element 8 connects to the underside of the spindle nut 7. The coupling element 8 also contains a pin 11 at its end, engaging in a seat 12 of the actuating element 2 in order to rotate the actuating element 2.

When comparing FIGS. 2 and 3, it is actually apparent that during the transition from the "released" state of FIG. 2 to the "locked" state in FIG. 3 the respective actuating element 2 has carried out a counter-clockwise rotation around its axis 13, as indicated by the arrow in FIG. 3. Simultaneously, a corresponding linear movement of the coupling element 8 and thus of the end pin 11 to the right occurs, as indicated by another arrow. In order to bring about this right movement of the end pin 11, the motor 4 has first completed the rotation in counter-clockwise direction as also indicated in FIG. 3.

FIG. 1 shows that the face of the coupling element 8 is L-shaped. The one L-shaped leg 8a of the coupling element 8 is connected to the underside of the spindle nut 7 to form a perpendicular elongation. The other L-shaped leg 8b perpendicularly protrudes from said L-shaped leg 8a and supports the pin 11 on the underside. As a result, the motor vehicle door latch housing 1 can have a particularly small design in the area of the motor 4 or of the one or first L-shaped leg 8a connecting to the underside of the spindle nut 7, as in particular apparent from FIG. 1. Due to the coaxial mounting of the spindle 6 on the driven shaft 5 it is actually only the cross section of the motor 4 that stipulates the inner width of the motor vehicle door latch housing 1 in this area.

As soon as the motor 4 is turned in counter-clockwise direction, this corresponds to the spindle nut 7 and thus also the coupling element 8, to be moved to the right during the transition from the "released" position of FIG. 2 to the "locked" position of FIG. 3. As a result, the actuating element 2 carries out the indicated counter-clockwise rotation around its axis 13, thus acting on the locking element 3 in the sense described above and in such a way that the actuating lever chain, starting from the internal door handle or external door handle is mechanically interrupted. At the end of this movement, the shown motor vehicle door latch is in the "locked" position depicted in FIG. 3, as a respective activation of the internal door handle or external door handle is without effect.

What is claimed is:

1. A drive arrangement for motorized adjustment of an actuating element, rotatably mounted inside a motor vehicle door latch housing, the drive arrangement comprising:
   a motor,
   a spindle drive connected to the motor, said drive comprising a spindle and a spindle nut mounted thereon, with the spindle being coaxially driven by a driven shaft of the motor and in which the spindle nut acts on the actuating element, and
   at least one coupling element interposed between the actuating element and the spindle nut for rotating the actuating element,
   wherein the spindle nut and the coupling element are integrally formed as a single-piece part unit.

2. The drive arrangement according to claim 1, wherein the coupling element extends from an underside of the spindle nut in a direction that is perpendicular to an axial drive direction of the spindle drive.

3. The drive arrangement according to claim 2, wherein the coupling element contains a pin at an end thereof that engages in a seat of the actuating element in order to rotate the actuating element.

4. The drive arrangement according to claim 3, wherein a face of the coupling element is L-shaped.

5. The drive arrangement according to claim 4, wherein a first leg of the face of the coupling element is connected to the spindle nut.

6. The drive arrangement according to claim 5, wherein a second leg of the face supports the pin.

7. The drive arrangement according to claim 6, wherein the pin protrudes from a side of the second leg that opposes a side at which the first leg is connected to the second leg.

8. The drive arrangement according to claim 6, wherein the pin is arranged at an end of the second leg opposite an end at which the first leg is connected to the second leg.

9. The drive arrangement according to claim 6, wherein the spindle nut contains a connection area for the coupling element in a longitudinal extension thereof and a threaded section for engaging into the spindle.

10. The drive arrangement according to claim 9, wherein the spindle nut contains at least one guide.

11. The drive arrangement according to claim 10, wherein the guide interacts with at least one counter guide in the motor vehicle door latch housing.

12. The drive arrangement according to claim 1, wherein the coupling element contains a pin at an end thereof that engages in a seat of the actuating element in order to rotate the actuating element.

13. The drive arrangement according to claim 12, wherein a face of the coupling element is L-shaped.

14. The drive arrangement according to claim 13, wherein a leg of the face of the coupling element is connected to the spindle nut.

15. The drive arrangement according to claim 14, wherein a second leg of the face supports the pin.

16. The drive arrangement according to claim 1, wherein a face of the coupling element is L-shaped.

17. The drive arrangement according to claim 1, wherein the spindle nut contains a connection area for the coupling element in its-a longitudinal extension thereof and a threaded section for engaging into the spindle.

18. The drive arrangement according to claim 17, wherein the spindle nut contains at least one guide.

19. The drive arrangement according to claim 18, wherein the guide interacts with at least one counter guide in the motor vehicle door latch housing.

* * * * *

UNITED STATES PATENT AND TRADEMARK OFFICE
CERTIFICATE OF CORRECTION

PATENT NO. : 11,028,912 B2  
APPLICATION NO. : 15/696329  
DATED : June 8, 2021  
INVENTOR(S) : Robert L. Brickner Page 1 of 1

It is certified that error appears in the above-identified patent and that said Letters Patent is hereby corrected as shown below:

In the Claims

Column 6, Lines 17 and 18:
"the spindle nut and the coupling element are integrally formed as a single-piece part unit"
Should read:
"the spindle nut and the coupling element are integrally formed as a single-piece part."

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*